United States Patent [19]
Chang et al.

[11] Patent Number: 5,991,885
[45] Date of Patent: Nov. 23, 1999

[54] METHOD AND APPARATUS FOR DETECTING THE PRESENCE OF A REMOTE DEVICE AND PROVIDING POWER THERETO

[75] Inventors: Wen F. Chang, Saratoga; Fang C. Yu, Fremont, both of Calif.

[73] Assignee: Clarinet Systems, Inc., San Jose, Calif.

[21] Appl. No.: 08/872,977

[22] Filed: Jun. 11, 1997

[51] Int. Cl.[6] .................................................. G06F 1/26
[52] U.S. Cl. ............................................. 713/300; 710/62
[58] Field of Search ...................... 395/750.01, 750.08, 395/200; 713/300; 710/62

[56] References Cited

U.S. PATENT DOCUMENTS

| | | | |
|---|---|---|---|
| 5,652,893 | 7/1997 | Ben-Meir et al. | 395/750.01 |
| 5,802,305 | 9/1998 | McKaughan et al. | 395/750.02 |
| 5,805,904 | 9/1998 | Jung | 395/750.01 |
| 5,845,150 | 12/1998 | Henion | 395/750.08 |

*Primary Examiner*—Glenn A. Auve
*Assistant Examiner*—David A. Wiley
*Attorney, Agent, or Firm*—Gray, Cary, Ware & Freidenrich

[57] ABSTRACT

A network system includes a network that detects the presence of a remote terminal connected to a network and determines the functional protocol of the remote terminal. If the remote terminal is an infrared adapter, the network hub provides electrical power to the infrared adapter and continually monitors for the presence of the infrared adapter. Upon removal of the infrared adapter, the network removes electrical power that is applied to a user interface connector that connects to the infrared adapter. If another protocol is detected for the remote terminal, the network hub communicates with the remote terminal in that protocol and converts the data to the protocol of the network.

18 Claims, 10 Drawing Sheets

METHOD AND APPARATUS FOR DETECTING THE PRESENCE OF A REMOTE DEVICE AND PROVIDING POWER THERETO

FIELD OF THE INVENTION

This invention relates to networking systems, and more particularly, to network hubs and network interface adapters for automatically and continuously detecting the presence of a remote adapter coupled to a network twisted-pair cable, providing electrical power from a network hub to the remote adapter via the network twisted-pair cable, creating a multi-protocol networking system, and automatically connecting the remote adapter to the appropriate network hub.

BACKGROUND OF THE INVENTION

When personal computers became sufficiently small to allow user portability, it became necessary to provide connections between a portable computer and a computer network system. Traditionally, the portable computer uses a Personal Computer Memory Card International Association (PCMCIA) card for either an Ethernet or Token Ring network hard wire connection.

Recently, both portable computers and computer networks include infrared transceivers that allow wireless communication between the portable computer and the computer network for increased mobility. The computer network includes a protocol conversion bridge that converts communicated data between an infrared protocol and a protocol of the computer network. The protocol conversion bridge is coupled to a connector typically near the user's work station. The connector is then coupled to a network hub that is centrally located. A dedicated electrical power supply located near the bridge and the infrared transceiver provides electrical power to the protocol conversion bridge. The dedicated electrical power supply increases the system cost and requires an AC electrical power outlet.

Several systems provide both electrical power and signals over a common wire. For example, conventional telephone systems that use 48V on a telephone wire transmit both electrical power and communication signals over a single pair of lines. U.S. Pat. No. 5,444,184 describes a system that transmits both electrical power and low baud rate signals over the same twisted-pair wires. An attachment unit interface (AUI) in LAN applications uses dedicated wires in a cable to provide electrical power from a data terminal equipment (DTE) to an external medium attachment unit (MAU) which could be 50 meters away from the DTE. All of these systems simply provide electrical power over the wires. None of these systems checks or confirms the type of system connected thereto before supplying the electrical power.

Standard network protocols may be described in an Open System Interconnection (OSI) interface standard. One standard network protocol is the Ethernet which is described in IEEE standard 802.3 CSMA/CD, the subject matter of which is incorporated by reference in its entirety. Another standard network protocol is the Token Ring protocol which is described in ANSI/IEEE standard 802.5, the subject matter of which is incorporated by reference in its entirety. Both of these IEEE standards describe the media access control (MAC) layer and the physical layer of the OSI interface.

Figure 1:
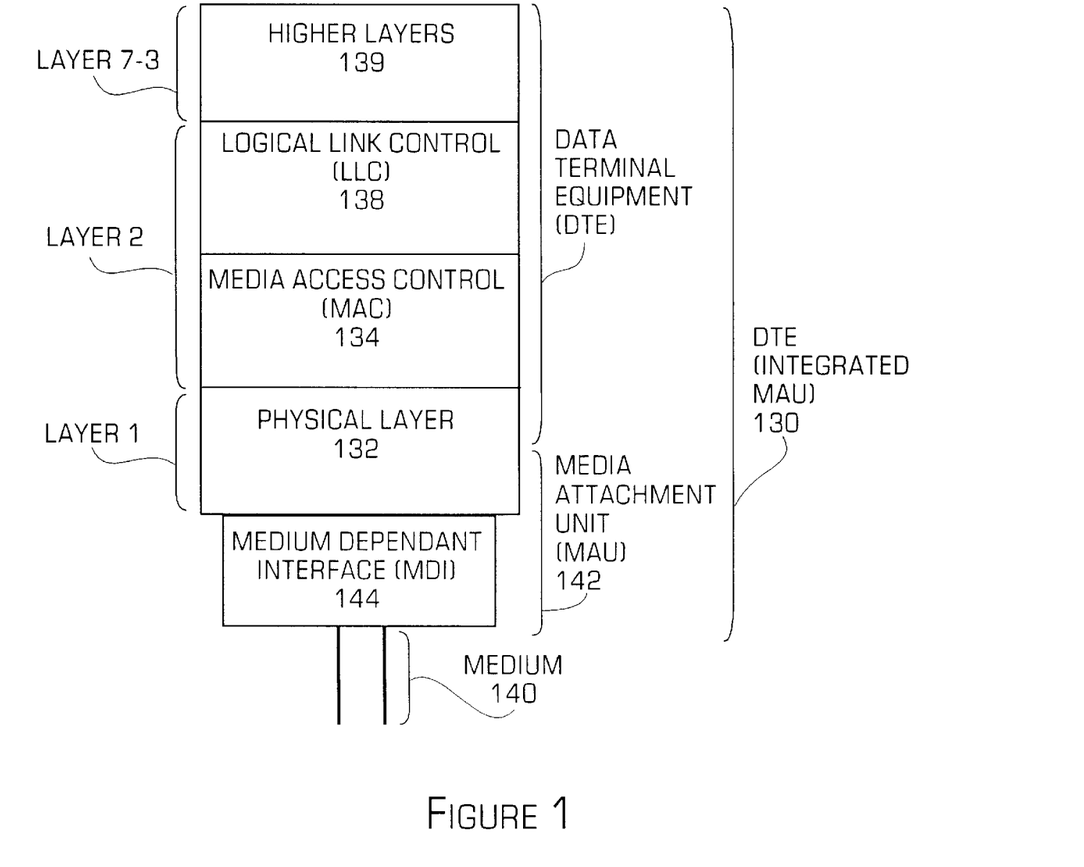
FIG. 1 is a pictorial view illustrating the interface layers of the open system interconnection model.

FIG. 1 is a pictorial view of the interface layers of the OSI standard. For simplicity, layer 3 through layer 7 of the OSI are combined as higher layers 139. Layer 2 of the OSI interface comprises the data link control (DLC) which includes a logical link control (LLC) layer 138 and a media access control (MAC) layer 134. Physical layer 1 of the OSI interface comprises several sublayers including an attachment unit interface (AUI). The AUI is specified for a 10 Mb/s Ethernet but not for a 100 Mb/s Ethernet. A media attachment unit (MAU) 142 includes all of the physical sublayers other than signaling and coding sublayer. In a twisted-pair cable, the medium dependent interface MDI 144 is an RJ45 connector.

Many conventional network systems detect either layer 1 or 2 that the data terminal equipment 130 supports. This detection allows the network systems to share circuitry, connectors, and the medium so that the network systems may handle multiple protocols. By sharing, the cost of the DTE is reduced and the inconvenience or damage is minimized when misconnection is made to the wrong connector. However, all of these conventional systems presume that the DTE conforms to the IEEE Standards. Accordingly, these detection systems test only systems that comply with the IEEE Standards. Depending on the range of the layers that these systems want to detect, the systems require a different degree of involvement and resources includes central processing units, software codes and flow, system bus, memory, protocol handler, and transceivers. The system also is protocol dependent and the DTE must run only the protocols that the system can understand. The systems are not intended, nor do they function to detect an electronic system which is not in conformance with IEEE Standards.

U.S. Pat. No. 5,497,460 discloses a detection mechanism that allows two different media access control layer protocols (Ethernet and Token Ring) to share the same connector and medium in the OSI model of FIG. 1. The detection scheme requires a sophisticated processing unit that issues a protocol dependent MAC frame and physical signals and compares a predefined status in memory to determine which one of the two presumed protocols runs on the twisted-pair cable. The detection scheme cannot communicate with any device which does not conform with Ethernet or Token Ring.

Under the same Ethernet MAC protocol, U.S. Pat. No. 5,410,535 describes a device that differentiates between mediums that the device is connected to so that the connected devices may share the same connector. The medium in this case could be a twisted-pair cable or AUI for other medium types. The control flow and logic manufactured in silicon are Ethernet physical layer dependent. U.S. Pat. No. 5,541,957 includes a separate physical layer logic to allow two Ethernet connections operating at different transfer rates to share the same connector.

U.S. Pat. No. 5,121,482 describes a device that detects the connected device independent of networking protocol. But its detection mechanism relies on the impedance of the data signal lines, its detection circuitry is also coupled directly to the data signal line, which may lead to interference or even corruption on the communication link when running the detection procedure.

It is desired to have a network system that recognizes remote devices connected to a connector of the network system in real time without intruding on the normal operation, provides appropriate electrical power as required without damaging the connected remote device, and automatically connects the device to a network hub running an appropriate protocol.

SUMMARY OF THE INVENTION

The present invention provides a detection circuit for detecting the presence of a remote device, which may or may not be a network device.

The present invention provides a system for controlling the application of electrical power to a detected device. The system includes a signal generator and a feedback analyzer. The signal generator receives a timing signal, a control signal, and a select signal. The signal generator provides a presence request signal in response to the select signal being in a first logic state and provides the control signal in response to the select signal being in a second logic state. The feedback analyzer is coupled to the detected device and provides a presence signal in response to the presence signal detected from the coupled device being of a predetermined type and being coupled to the output of the signal generator. The feedback analyzer provides the select signal in a second logic state when such a device is detected and provides the select signal of a first logic state when such a device is not detected. The feedback analyzer controls the application of electrical power to the coupled device of a predetermined type in response to the present signal.

The present invention provides a method for applying electrical power. At a first detection time, a first device is an initiator and applies a symmetric bipolar signal to a second device. At a second detection time, a feedback signal from the second device, based upon the signal supplied by the first device at the first detection time, triggers a comparator and indicates the successful connection of the second device to the first device. Alternatively, the second device may provide the feedback signal based on another electrical power source and not based on the symmetric bipolar signal. At a third detection time, the first device supplies a current limited electrical power to the second device. At a fourth detection time, the second device uses the electrical power gained from the first device to sustain its own operation also use it to derive the feedback signal to replace the original signal that is provided by the first device. At a fifth detection time, the first device is freed to remove the applied signal state in the first detection time, and use the same line for other purpose.

The present invention provides a network system that includes a plurality of user interface connectors and first and second network hubs. Each of the plurality of user interface connectors is adapted for coupling to a remote device. The first network hub communicates on a first operational protocol. The second network hub is coupled to the plurality of user interface connectors for communicating data between devices coupled thereto and is coupled to the first network hub. The second network hub identifies the operational protocol of a coupled device. When the identified operational protocol of the coupled device is a first operational protocol, the second network hub communicates data between the first and second network hubs. When the identified operational protocol of the coupled device is a second operational protocol, the second network hub communicates with said coupled device in a second operational protocol and identifies the presence of an adapter of a first type coupled to at least one of the plurality of user interface connectors and continuously provides electrical power to the adapter in response to the identified presence of the adapter. The second network hub stops providing electrical power to the adapter in response to no identified presence of the adapter.

DETAILED DESCRIPTION OF THE PREFERRED EMBODIMENTS

The methods and systems of the present invention instantly and continuously detect the connection status during idle or normal operation of the systems. In one embodiment of the present invention, the system, without the presence of a detected network adapter, assumes a connected device uses a specific protocol, such as Ethernet or Token Ring. In another embodiment of the present invention, the network system is configured for an infrared (IR) adapter or Ethernet and not Token Ring. In such a system, a user connector of the system functions with either an IR adapter or an Ethernet adapter. In another embodiment of the present invention, the network system is configured for an IR adapter or Token Ring, and not for Ethernet. In such a system, a user connector of the system functions with either an IR adapter or a Token Ring adapter. In yet another embodiment of the present invention, the network system is configured for an IR adapter, Token Ring, and Ethernet.

More particularly, the network hub 202 (FIG. 2) and the network hub 302 (FIG. 3) of the present invention provide the electrical power to the detected device when the presence of the detected device is confirmed, and does not provide electrical power to the connector and the twisted-pair cable when either adapters of another type (such as Ethernet 10Base-T, 100Base-TX 100Base-T4, and Token Ring adapters) are connected or when no adapter is connected. Since the detected device receives the electrical power from the detecting device, a separate costly electrical power supply is not needed. The systems of the present invention reduce cost, and eliminate the massive interconnection wires and the electrical power plug in the office.

Figure 2:
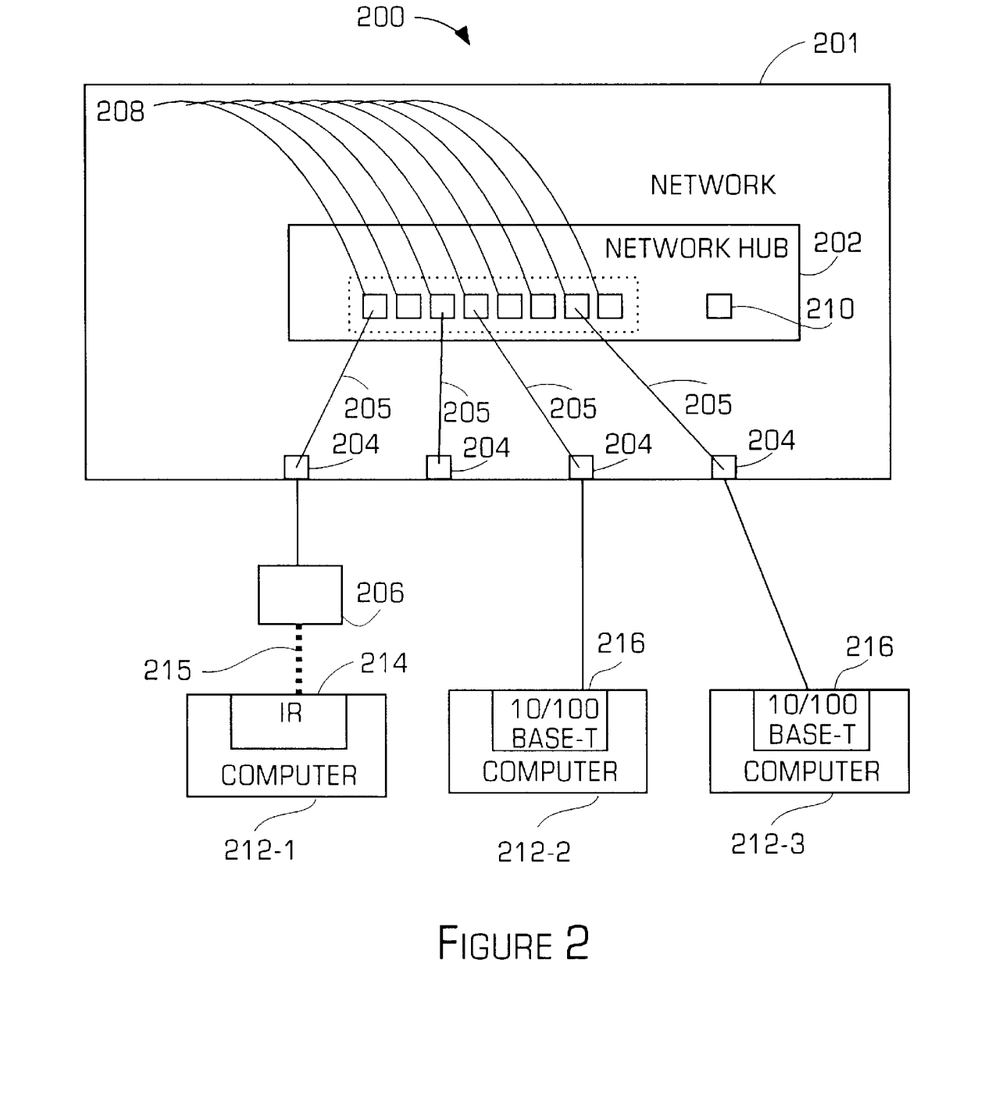
FIG. 2 is a block diagram illustrating a network system in accordance with the present invention.

FIG. 2 is a block diagram illustrating a network system 200 in accordance with the present invention. The network system 200 includes a network 201 and a plurality of computers 212. For clarity, only three computers, 212-1 through 212-3, are shown. The computers 212 may be, for example, workstations, portable computers, desktop PCs, or personal digital assistants (PDA).

The network 201 includes a network hub 202, a plurality of twisted-pair cables 205, a plurality of user interface connectors 204, and an infrared adapter 206. For simplicity and clarity, only four twisted-pair cables 205 and four user interface connectors 204 are shown. Also, for clarity, only one infrared adapter 206 is shown. Of course, the network 201 may include other numbers of network hubs 202, hub user connectors 208, twisted-pair cables 205, user interface connectors 204, and infrared adapters 206.

The network hub 202 includes a plurality of hub user connectors 208 and an up-link connector 210. The up-link connector 210 allows the network 201 to be connected to another network (not shown). The computer 212-1 includes a first interface 214 which is an infrared transceiver. The computer 212-1 communicates in a first protocol via the infrared transceiver 214 with the infrared adapter 206. In one embodiment of the present invention, the first protocol is an infrared protocol. The computers 212-2 and 212-3 each include a second computer interface 216 that communicates in a second protocol. In one embodiment of the present invention, the protocol of the computer interface 216 is a 10Base-T or 100Base-TX protocol. In another embodiment of the present invention, the protocol of the computer interface 216 is a Token Ring protocol. In one embodiment of the present invention, the user interface connectors 204 are conventional RJ45 connectors.

The computers 212-2 and 212-3 may be physically connected to the network 201 via the hub user connectors 208 by physical wire connections, such as twisted-pair wires, between the respective second computer interfaces 216 and the user interface connectors 204. The twisted-pair cable according to one embodiment of the present invention may be conventional category 3 or 5 twisted-pair cable. The wire may be disconnected at the computer 212-2 or 212-3 to allow the user to have portability of the associated computer 212.

The network 201 communicates with the plurality of computers 212 via the user interface connectors 204, using the infrared adapter 206 for wireless communication or using the computer interfaces 216 for wired communication. Specifically, the computer 212-1 communicates without wire and instead uses an infrared signal 215 communicated between the IR adapter 206 and the IR transceiver 214 of the computer 212-1 to communicate with the network 201. The plurality of computers 212 may communicate with each other via the hub user connectors 208 or communicate with another network via the up-link connector 210.

The network 201, according to one embodiment of the present invention, is a Local Area Network (LAN) and may link to other networks.

The network 201 recognizes the protocol of computers 212 coupled to the network hub 202 and communicates with the computer 212 in the appropriate protocol. The network 201 provides electrical power to an IR adapter 206 when the IR adapter 206 is coupled to the network hub 202, but does not provide electrical power for other adapter for other protocols. If the network 201 determines that another type of device other than an IR adapter 206 is coupled to a user interface connector 204, the network 201 does not apply electrical power. The network system 200 provides wireless communication between computers 212 and the network 201. Although the adapter 206 is described herein as operating with infrared, the adapter 206 may provide wireless coupling other than infrared, such as radio frequency. In such a case, the network system 200 may be modified to operate with these other means of wireless coupling or combinations thereof.

Specifically, the network hub 202 determines whether a remote device is connected to the user interface connectors 204 and determines the type of the remote device. If an infrared adapter 206 is connected to a user interface connector 204, the network hub 202 provides electrical power to the IR adapter 206 in response to such detection, and stops providing electrical power to the IR adapter 206 in response to no detection of the IR adapter 206.

A user may place a computer 212-1 in the vicinity of the IR adapter 206 and communicate with the network 201. The IR adapter 206 provides bi-directional communication between the network hub 202 and an IR transceiver 214 of the computer 212-1. The network hub 202 converts data from an IR protocol to the protocol of the network and vice versa. The network hub 202 also converts data from the protocol of either of the computers 212-2 or 212-3 into the protocol of the network and vice versa. Accordingly, the network hub 202 allows communication between any of the computers 212 by making the appropriate protocol conversion.

Figure 3:
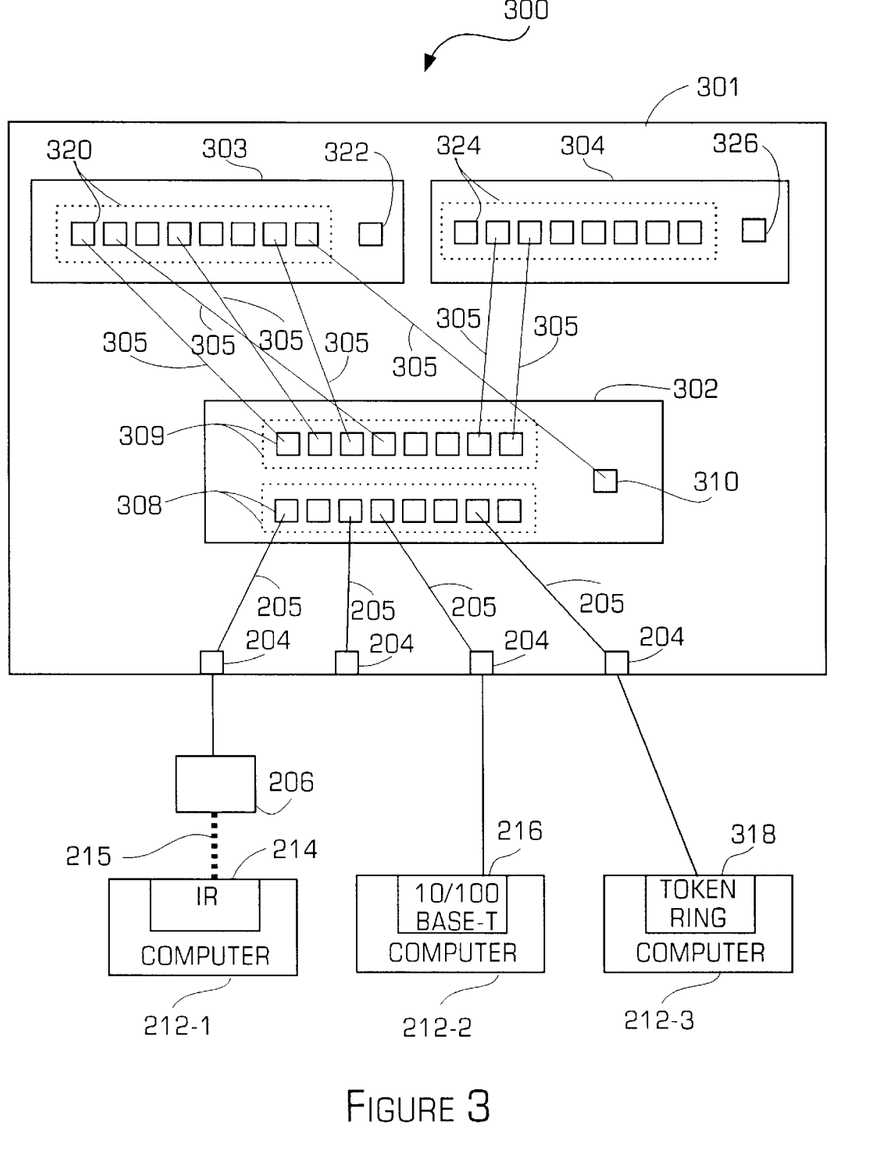
FIG. 3 is a block diagram illustrating a network system in accordance with another embodiment of the present invention.

FIG. 3 is a block diagram illustrating a network system 300 in accordance with the present invention. The network system 300 includes a network 301 and a plurality of computers 212. For clarity, only three computers 212-1 through 212-3 are shown. The computers 212-1 through 212-3 include respective computer interfaces 214, 216, and 318. The computer interface 318 communicates in a third protocol.

The network 301 includes a first network hub 302, a second network hub 303, an optional third network hub 304, a plurality of hub user connectors 204, and first and second pluralities of twisted-pair cables 205 and 305, respectively. The network 301 may include additional network hubs.

The network hub 302 includes a plurality of hub user connectors 308, a plurality of pass-through connectors 309, and an up-link connector 310. The network hub 303 includes a plurality of hub user connectors 320 and an up-link connector 322. The network hub 304 includes a plurality of hub user connectors 324 and an up-link connector 326. The twisted-pair cables 305 couple the pass-through connectors 309 of the network hub 302 to respective hub user connectors 320 of the network hub 303. Likewise, twisted-pair cables 305 couple the pass-through connectors 309 of the network hub 302 to respective hub user connectors 324 of the network hub 304.

The network 301 communicates with the computers 212 in a manner similar to that described above in conjunction with the network 201 of FIG. 2. However, communications within the network 301 differs from communication within the network 201. Specifically, the network hub 302 processes data in an infrared protocol and passes through data in other protocols to the network hubs 303 and 304 for processing.

The first network hub 302 determines whether an infrared adapter 206 is coupled to a user interface connector 204, and if such an IR adapter 206 is detected, the first network hub 302 converts the data between the protocol of the IR adapter 206 and the network hub 303 in a manner similar to that of the network hub 202 of FIG. 2. However, if an IR adapter 206 is not detected, the first network hub 302 couples the corresponding hub connector 308 to the corresponding pass-through connector 309 for communication with either the second hub 303 or the third hub 304. The network hub 302 does not process the data from the adapter. Hence, the first network hub 302 merely passes data communicated between the second network hub 303 or the third network hub 304 and the computer 212 without further processing.

The network hub 302 implements a "pass through" of network data to allow the system to use conventional network hub 303 and/or 304 to support a standard network protocol such as Ethernet and/or Token Ring. In one embodiment of the present invention, the network 301 is coupled only to a computer that is in one of two protocols, for example, an infrared protocol and an Ethernet protocol. The present invention allows a user using an existing network hub to establish a multiple protocol network system 301 for infrared communication, Ethernet and/or Token Ring. Multiple networking protocols share the same connector 204. Reusing existing conventional hubs and sharing the same connector reduces the system cost and increases the convenience of network access.

Figure 4A:
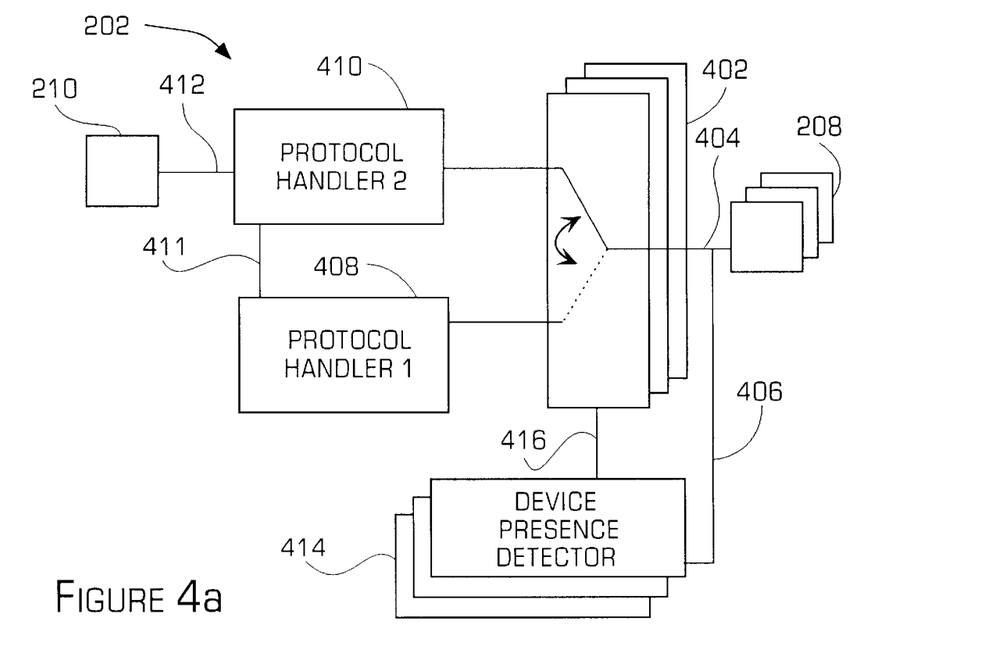
FIG. 4a is block diagram illustrating the network hub of the network system of FIG. 2 in accordance of the present invention.

FIG. 4a is a block diagram illustrating the network hub 202 in accordance with the present invention. The network hub 202 includes a plurality of hub user connectors 208, an up-link connector 210, connection path 402, networking data path 404, detection path 406, first and second protocol handlers 408 and 410, respectively, networking data path 411 and 412, a plurality of device presence detectors 414, and select signal path 416.

The networking data path 404 couples the hub user connector 208 to a first terminal of the connection path 402. The detection path 406 couples the device presence detector 414 to the hub user connector 208. The first and second protocol handlers 408 and 410, respectively, are coupled to respective second and third terminals of the connection path 402. The networking data path 411 couples the first and second protocol handlers 408 and 410. The networking data path 412 couples the second protocol handler 410 to the up-link connector 210. The select signal path 416 couples the device presence detector 414 to the connection path 402.

The device presence detector 414 provides a presence request signal on the detection path 406 which is applied to the hub user connector 208 for determining whether an infrared adapter 206 is coupled to the hub user connector 208. If an infrared adapter 206 is not coupled to the hub user connector 208, the device presence detector 414 applies a signal to the select signal path 416 that selectively couples the hub user connector 208 through the connection path 402 to the second protocol handler 410 which communicates with a computer 212 connected to hub user connector 208 in the second protocol. Communication with another network (not shown) by the second protocol handler 410 is via the up-link connector 210. On the other hand, if the infrared adapter 206 is coupled to the hub user connector 208, the device presence detector 414 provides a select signal on the select signal path 416 to couple the hub user connector 208 through the connection path 402 to the first protocol handler 408. The first protocol handler 408 may communicate with another network (not shown) via the networking data paths 411 and 412, and the up-link connector 210.

The first protocol handler 408 performs the conversion between the first protocol and the second protocol, and also performs repeater or switching functions of the first protocol among the user connectors 208 with IR adapters 206. The second protocol handler 410 performs repeater or switching functions of the second protocol among up-link connector, the first protocol handler 408, and user connectors 208, without IR adapters 206. Connection paths 402 provide networking paths between the first protocol handler 408 and user connectors 208 with IR adapters 206, and the networking paths between the second protocol handler and user connectors 208 without IR adapters 206. Networking path 411 allows both protocol handlers 408 and 410 to share the components for the up-link path.

Figure 4B:
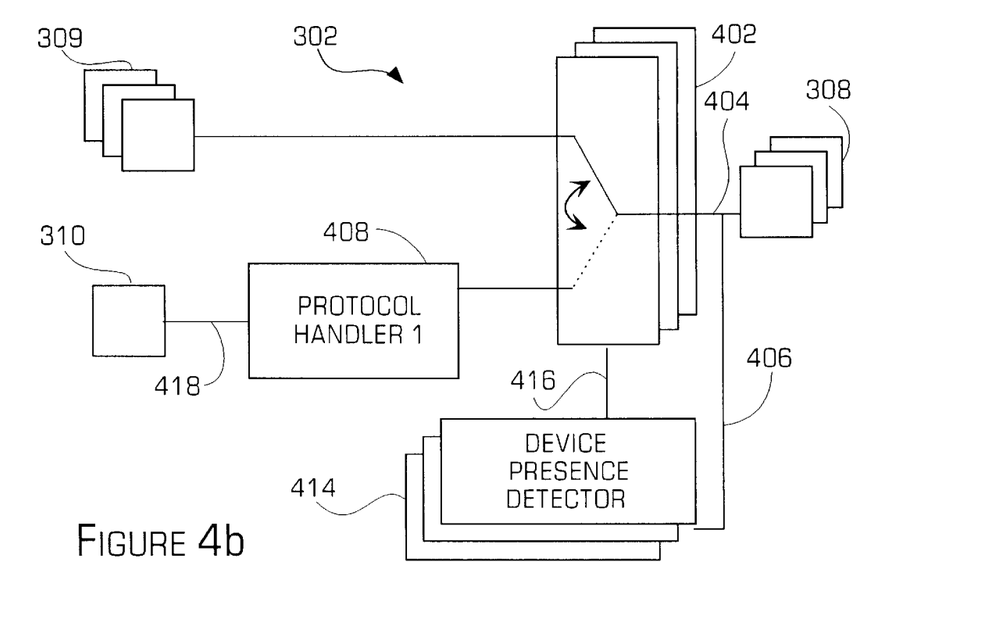
FIG. 4b is a block diagram illustrating a network hub of the network system of FIG. 3 in accordance with another embodiment of the present invention.

FIG. 4b is a block diagram illustrating the network hub 302 in accordance with the present invention. The network hub 302 includes a plurality of hub user connectors 308, a plurality of pass-through connectors 309, an up-link connector 310, connection path 402, networking data path 404, detection path 406, protocol handler 408, a plurality of device presence detectors 414, select signal path 416 and networking data path 418.

The networking data path 404 couples the hub user connector 308 to a first terminal of the connection path 402. The detection path 406 couples the device presence detector 414 to the hub user connector 308. The protocol handler 408 is coupled to a second terminal of the connection path 402. The networking data path 418 couples the protocol handler 408 to the up-link connector 310. The pass-through connector 309 is coupled to a third terminal of the connection path 402. The select signal path 416 couples the device presence detector 414 to the connection path 402.

The device presence detector 414 provides a presence request signal on the detection path 406 which is applied to the hub user connector 308 for determining whether an infrared adapter 206 is coupled to the hub user connector 308. If an infrared adapter 206 is not coupled to the hub user connector 308, the device presence detector 414 applies a select signal to the select signal path 416 that selectively couples the hub user connector 308 through the connection path 402 to the pass-through connector 309. This allows communication between a network hub 303 or 304 with a computer 212 coupled to the hub user interface connector 308. In this way, the network hub 302 merely passes data between the network hub 303 or 304 to the computer 212. Such communication is in the protocol of the network hub 303 or 304. On the other hand, if an infrared adapter 206 is coupled to the hub user connector 308, the device presence detector 414 provides a select signal on a select signal path 416 to couple the hub user connector 308 through the connection path 402 to the protocol handler 408. Communication between the network hub 302 and the computer 212 is an infrared protocol. The protocol handler 408 may communicate with another network (not shown) via the up-link connector 310. The protocol handler 408 performs the conversion between the IR protocol and the second protocol, and also performs repeater or switching functions of the IR protocol among user connectors 208 with IR adapters 206.

By way of background, local-area network (LAN) applications that include a twisted-pair cable as the media for data transfer typically use a standard RJ45 connector between components of the system, such as a networking port on PC, workstation, hub, bridge, or router. For example, a standard RJ45 connector is used with twisted-pair cable in Ethernet 10Base-T, 100Base-T, and Token Ring systems. The twisted-pair cable contains 6 wires (3 pairs) or 8 wires (4 pairs). The LAN of these systems typically follow the OSI physical layer standard of FIG. 1 above in which a twisted-pair cable carries electrical signals without electrical power. 10Base-T, 100Base-TX, and Token Ring use 2 pairs of the twisted-pair cable and leave the other unused wires open or grounded. In 10Base-T and 4/16 Mb Token Ring applications, the noise immunity is better, so the unused wires usually are left open.

Figure 5A:
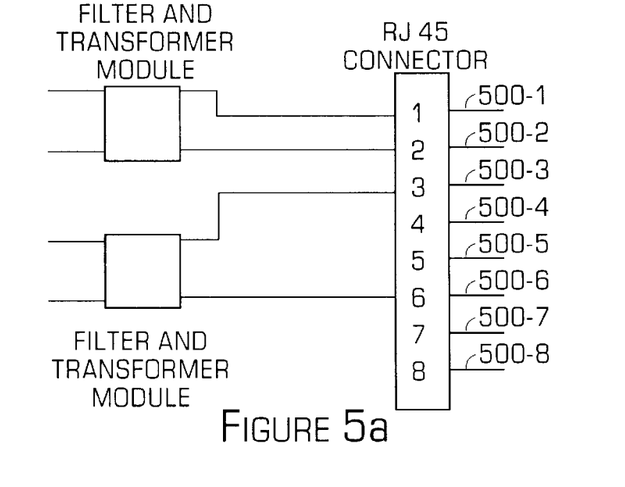
FIG. 5a is a schematic diagram illustrating a conventional 10Base-T twisted-pair cable connection.
Figure 5B:
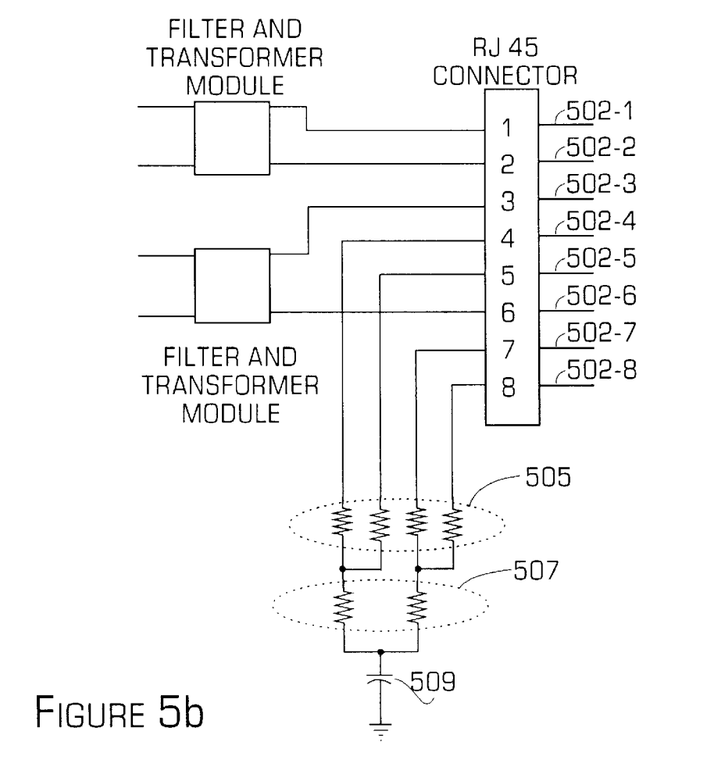
FIG. 5b is a schematic diagram illustrating a conventional 100Base-TX twisted-pair cable connection.
Figure 5C:
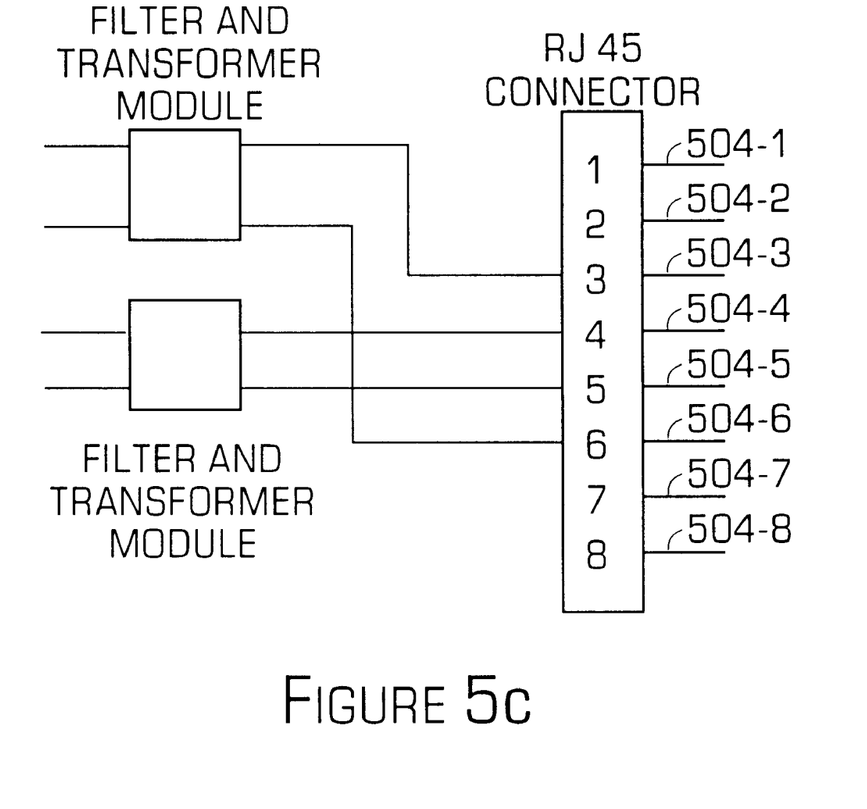
FIG. 5c is a schematic diagram illustrating a conventional Token Ring twisted-pair cable connection.

FIGS. 5a through 5c describe the conventional twisted pair cable connection for 10Base-T, 100Base-TX, and Token Ring protocols, respectively.

FIG. 5a is a schematic diagram illustrating a conventional 10Base-T twisted-pair cable connection. The cable connection includes a plurality of lines 500-1 through 500-8. The dash numbers of the reference numbers of the lines 500 correspond to the pin numbers that are assigned in the 10Base-T protocol by the IEEE Ethernet standard. Lines 500-1, 500-2, 500-3, and 500-6 carry signals and couple to a transformer. Lines 500-4, 500-5, 500-7 and 500-8 are normally left open. These unused lines form an open circuit. The system may implement similar common ground circuitry as in 100Base-TX to reduce noise and improve signal quality.

FIG. 5b is a schematic diagram illustrating a conventional 100Base-TX twisted-pair cable connection. The cable connection includes a plurality of lines 502-1 through 502-8. The dash numbers of the reference numbers of the lines 502 correspond to the pin numbers that are assigned in the 100Base-TX protocol by the IEEE Ethernet standard. Lines 502-1, 502-2, 502-3, and 502-6 carry signals and couple to a transformer. Lines 502-4, 502-5, 502-7 and 502-8 are normally connected to ground through common mode termination resistors 505 and 507 and capacitor 509 in order to reduce the noise pick-up and injection to signal lines. These unused lines form a circuit having resistance between these lines. Although the IEEE 802.3 Standard for Ethernet recommends the value of such resistance, there is no guarantee what the actual resistance is. For example, some commercially available products do not include resistors 505.

FIG. 5c is a schematic diagram illustrating a conventional Token Ring twisted-pair cable connection. The cable connection includes a plurality of lines 504-1 through 504-8. The dash numbers of the reference numbers of the lines 504 correspond to the pin numbers that are assigned in the Token Ring protocol by the IEEE Token Ring standard. Lines 504-3, 504-4, 504-5, and 504-6 carry signals and couple to a transformer. Lines 504-1, 504-2, 504-7, and 504-8 are normally left opened. The system may implement similar common ground circuitry on unused lines to reduce noise and improve signal quality.

Table I describes the pin assignment of the user interface connector 204 for the 10Base-T, 100Base-TX, and Token Ring interfaces as described in connection with FIGS. 5a through 5c.

TABLE I

| RJ45 pin at DTE of the station | 10 Base-T Interface | 100 Base-TX Interface | Token Ring Interface |
| --- | --- | --- | --- |
| 1 | TX+ | TX+ | Unused |
| 2 | TX− | TX− | Unused |
| 3 | RX+ | RX+ | TX+ |
| 4 | Unused | Termination | RX+ |
| 5 | Unused | Termination | RX− |
| 6 | RX− | RX− | TX− |
| 7 | Unused | Termination | Unused |
| 8 | Unused | Termination | Unused |

The system of the present invention is independent of whether the unused lines in the network behave as an open circuit with high resistance or a circuit with low resistance termination circuit. By such recognition, the systems 200 and 300 of the present invention do not provide large currents that could potentially damage the resistor or transformer in the interface of the unused lines in an Ethernet protocol. Further, the systems 200 and 300 of the present invention provide such detection during functional operation of the system without interfering with the operation. Accordingly, the systems 200 and 300 of the present invention are able to detect a change in the connection during normal operation.

In order to perform detection that is continuous and does not interfere with the normal transmit and receive, the device presence detector 414 does not connect to the signal lines—twisted-pair cable line 1, 2, 3, 6 in Ethernet protocol nor connect to line 3, 4, 5, 6 in Token Ring protocol.

Figure 6A:
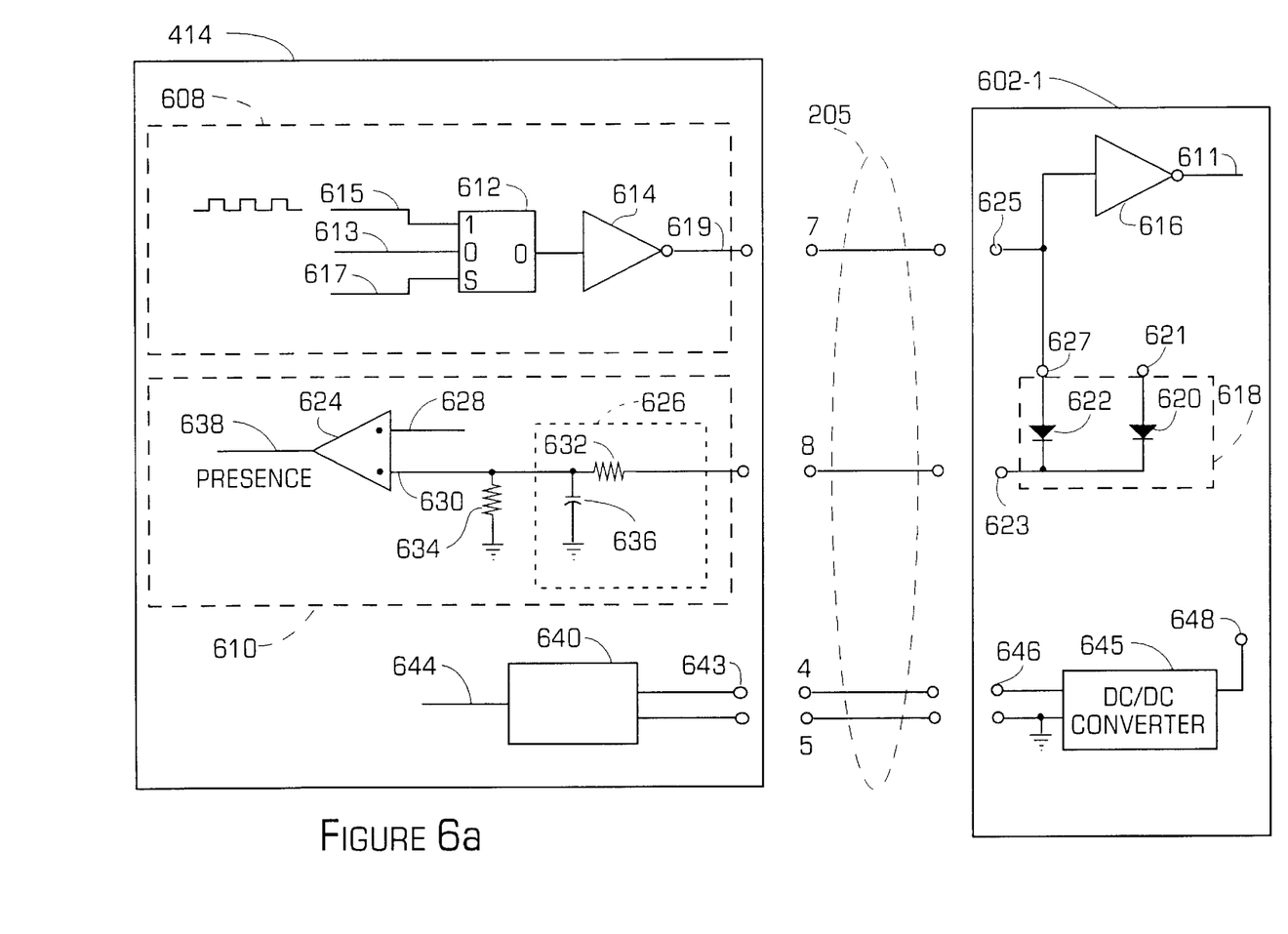
FIG. 6a is a schematic diagram illustrating a device presence detector that is coupled to a remote adapter of a first type in accordance with the present invention.

FIG. 6a is a schematic diagram illustrating the device presence detector 414 coupled to a remote terminal 602-1 which is an infrared adapter 206 through a twisted-pair cable 205. The device presence detector 414 includes a signal generator 608, a feedback analyzer 610, and a electrical power supply circuit 640. The signal generator 608 includes a multiplexer 612 and an interface driver 614. A control signal 613 is applied to the first input of the multiplexer 612. In one embodiment of the present invention, the control signal 613 is a general purpose signal. A low frequency timing signal 615 is applied to a second input of the multiplexer 612.

In one embodiment of the present invention, the timing signal 615 is a symmetric clock signal with approximately a 50% duty cycle. A select signal 617 selects which of the applied signals the multiplexer provides to the output of the multiplexer 612. The output of the multiplexer 612 is coupled to an input of the interface driver 614 which provides a presence request signal 619 at an output coupled to the twisted-pair cable 205. The interface driver 614 may be, for example, an industrial standard RS232 driver.

The remote terminal 602-1 includes a receiver 616, a diode circuit 618 and a DC-to-DC converter 645. The diode circuit 618 includes a first diode 620 and a second diode 622. A continuous presence signal 621 is coupled to the anode of the first diode 620. The cathode of the first diode 620 is coupled to an output terminal 623 of the remote terminal 602-1. The second diode 622 has an anode coupled to the common node formed by the input of the receiver 616 and an input terminal 625 of the remote terminal 602-1 and has an cathode coupled to an output terminal 623.

The interface driver 614 of the signal generator 608 provides either the control signal 613 or the timing signal 615 to the receiver 616 and to the anode of the diode 622. The receiver 616 may be, for example, an RS232 receiver. The output signal from the signal generator 608 is returned to the feedback analyzer 610 through the diode 622.

The feedback analyzer 610 of the presence detector 414 includes a voltage comparator 624, a low-pass filter 626, a reference voltage 628 and a resistor 634. The reference voltage 628 is lower than the continuous presence signal 621 used in the remote terminal 602-1 and lower than the peak output voltage from the interface driver 614. The low-pass filter 626 includes a resistor 632 and a capacitor 636. The resistor 634 connected in parallel with the capacitor 636 provides a discharge path for the capacitor 636. The reference voltage 628 is coupled to the inverting input of the comparator 624. The input of the low-pass filter 626 receives the feedback signal from the remote terminal 602-1 and filtered signal 630 is coupled to the non-inverting input of the comparator 624. The diode circuit 618 provides the feedback signal to the terminal 623. The feedback signal may be a presence signal. The presence signal may be an initial presence signal provided by the diode 622 or a continuous presence signal provided by the diode 620. The initial presence signal is provided by diode 622 during the detection phase in response to the presence request signal 619. During the connection phase, the diode 620 provides the continuous presence signal 621.

During the detection phase, the timing signal 615 is selected and the presence request signal 619 is provided to the remote terminal 602-1. The diode 622 in combination with the low-pass filter 626 forms a peak-detecting circuit in the feedback path. The filtered signal 630 is kept at the peak level of the presence request signal 619. Because the filtered feedback signal 630 at the non-inverting input of the comparator 624 is higher than the threshold voltage 628 at the inverting input of the comparator 624, the comparator 624 sets the presence signal 638.

In one embodiment of the present invention, the system may include more than one types of remote terminal 602-1, for example, 602-1a and 602-1b. In order to distinguish them, the feedback analyzer 610 includes additional voltage comparators coupled to different reference voltages. Accordingly, the systems 200 and 300 can support various combinations of protocols such as different versions of IR adapters or radio frequency adapters with Ethernet and/or Token Ring by using the same user interface connectors 204.

For example, different voltages may be used for continuous presence signal 621 in both the remote terminal 602-1a and the remote terminal 602-1b. First, the continuous presence signal 621 in terminal 602-1a is set to 3VDC and in terminal 602-1b to 5VDC. And then in the feedback analyzer, the threshold voltage of the first comparator is set to 2V and the second comparator is set to 4V. When terminal 602-1a is attached to the system, the level of the feedback signal from terminal 602-1a triggers the first comparator, so the presence signal from the first comparator goes high. When terminal 602-1b is attached to the system, the feedback signal is high enough to trigger both comparators; thus the presence signals from both comparator goes high.

The voltage comparator 624 provides a presence signal 638 when the filtered signal 630 is above the threshold set by the reference voltage 628, and is removed when the voltage falls below such threshold.

The feedback analyzer 610 provides the presence signal 638 when the detected remote terminal 602-1 is connected and does not provide the presence signal when either no remote terminal 602 is connected or the remote terminal 602 is not remote terminal 602-1 as described below in conjunction with FIG. 6b and 6c.

When the presence signal 638 is set, the device presence detector 414 starts to supply electrical power to the remote terminal 602-1 by activating output enable signal 644 of the electrical power supply 640.

A DC-to-DC converter 645 in the remote terminal 602-1 converts the electrical power from the device presence detector 414 to a suitable voltage level 648 to sustain its own circuits, and also applies a continuous presence signal 621 coupled to the anode of diode 620. This continuous presence signal 621 is sufficiently high to retain the presence signal 638 in an on state. At this point the same line that provides presence request signal 619 is no longer required and can be used for other functions. The select signal 617 of the multiplexer 612 may be automatically switched from the timing signal 615 to the control signal 613 then coupled to control signal 611 after presence is detected.

The operation is in a connection phase when the remote terminal begins to provide the continuous presence signal. At any time of the connection phase, if the remote terminal 602-1 is disconnected, the filtered signal 630 starts to discharge through the resistor 634, and the presence signal 638 is disabled when the filtered signal 630 drops below the threshold. This causes the electrical power to be disconnected and the operation of the device presence detector 414 returns to the detection phase.

In one embodiment of the present invention, the feedback signal can be generated from the remote terminal with a self equipped electrical power. In one embodiment of the present invention, the remote terminal includes a battery (not shown) for generating a presence signal which is applied to the anode of the diode 622. In such an embodiment, the battery adds to the cost of the system and may eventually discharge.

Figure 6B:
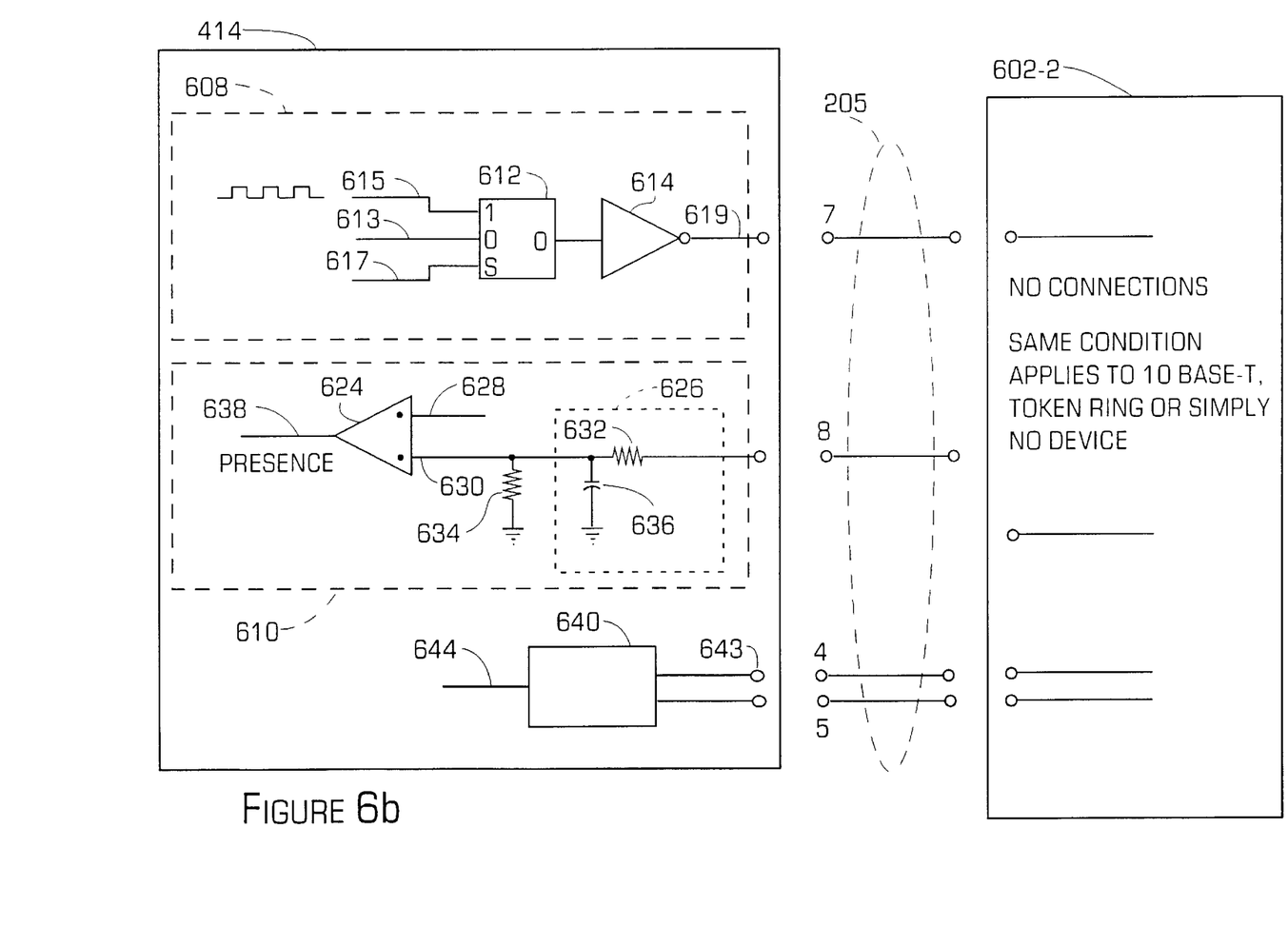
FIG. 6b is a schematic diagram illustrating a device presence detector coupled to a remote adapter of a second type in accordance with the present invention.

FIG. 6b is a block diagram illustrating the device presence detector coupled to a remote adapter of a second type in accordance with the present invention. The adapter 602-2 has no connections coupled to the output of the driver 614, the input of the low pass filter 626 or the electrical power and ground terminals of the electrical power supply 640. Accordingly, the presence request signal 619 cannot provide a feedback signal to the feedback analyzer 610. Because no signal is received, the comparator 624 does not generate a presence signal 638 to indicate that an infrared adapter 206 is coupled to the device presence protector 414.

Figure 6C:
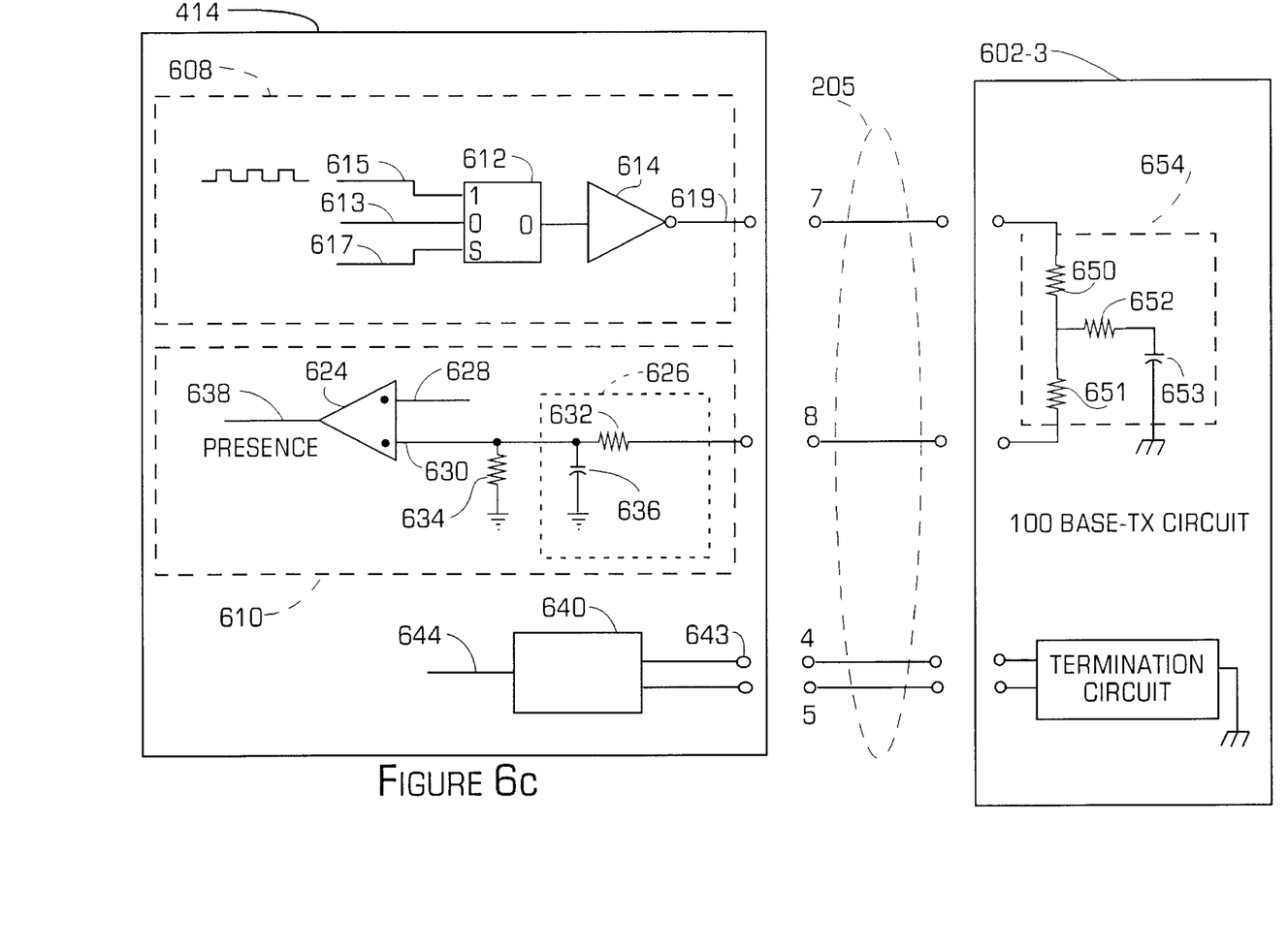
FIG. 6c is a schematic diagram illustrating a device presence detector coupled to a remote adapter of a third type in accordance with the present invention.

FIG. 6c is a block diagram illustrating the device presence detector 414 coupled to a adapter 602-3 of a third type in accordance with present invention. The adapter 602-3 includes common ground circuitry 654 which contains first, second and third resistors 650,651 and 652, respectively and a capacitor 653. The common ground circuitry functions as a termination circuit. The first and second resistors 650 and 651, respectively, are series connected between the input and output terminals of the adapter 602-3 which when connected to the device presence detector 414, couple the output of the signal generator 608 and the input of the feedback analyzer 610. The electrical power and ground terminals of the electrical power supply 640 are left open when connected to the adapter 602-3. The third resistor 652 is coupled on a first end to the common node of the first and second resistor 650 and 651, respectively. The other terminal of the third resistor 652 is coupled by the capacitor 653 to the ground. When the adapter 602-3 is coupled to the device presence detector 414, the low-pass filter 626 of the feedback analyzer 610 blocks out the AC element of the feedback signal, and allows only the DC level of the feedback signal to pass. The DC level of the feedback signal may be near 0 volts, which is less than the reference voltage 628, and thus the comparator 624 does not generate a presence signal 638.

Figure 7:
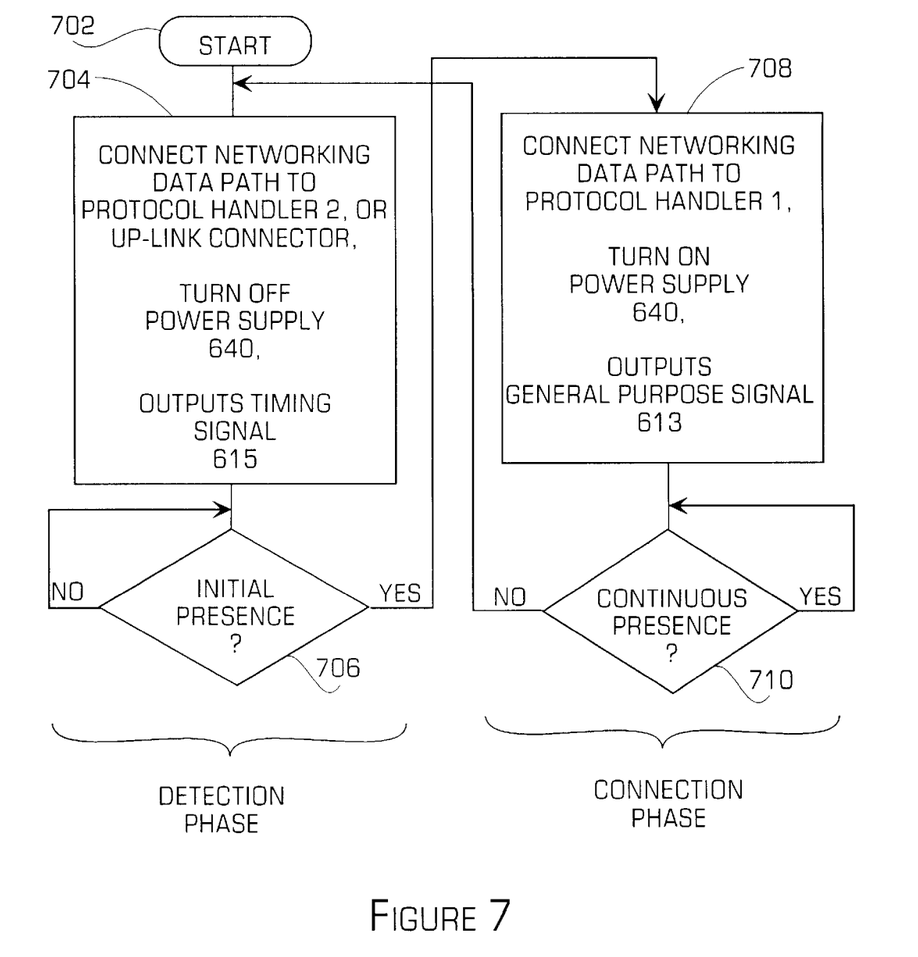
FIG. 7 is a flow diagram illustrating the operation of the device presence detector of FIGS. 6a–6c in accordance with the present invention.

FIG. 7 is a flow diagram illustrating the operation of the device presence detector 414 in accordance with the present invention. The device presence detector 414 operates in a detection phase or in a connection phase. When the device presence detector 414 starts 702 detection, the device presence detector 414 enters the detection phase. The pass through connection path 402 is set to connect the networking data path from the hub user connector 208 to the second protocol handler 410 or up-link connector 210 or 310. The electrical power supply 640 is turned off to remove applied electrical power from the remote terminal 602. The select signal 617 is set to a first logic state to enable the multiplexer 612 to apply the timing signal 615 to the driver 614 and thus to the remote terminal 602. The device presence detector 414 monitors 706 the presence signal. When the presence signal is on, the device presence detector 414 enters the connection phase. The networking data path is set to connect the hub user connector 208 to the first protocol handler by enabling the pass through connection path 402 to couple the hub user connector 208 to the first protocol handler 408. The electrical power supply 640 is turned on 708 to apply electrical power to the remote terminal. The select signal 617 is set to a second logic state to command the multiplexor 612 to provide the control signal 613 to the driver 614 for application to the remote terminal 602. The device presence detector 414 monitors 710 the present signal, and remains in the connection phase until the present signal is not present (e.g., off). The device presence detector 414 reenters the detection phase and turns off the electrical power supply 640 and sets the network data path to the second protocol handler and proceeds as described above by connecting the hub users connectors 208 to the second protocol handler 410 or to the pass through connectors 309.

Table II describes the signals present at the interface of the user interface connector 204 at the detection phase and at the connection phase.

TABLE II

| Pin of the hub user connector 208 and 308 | Interface at detection phase | Interface at connection phase |
|---|---|---|
| 1 | Pass through | Data signal |
| 2 | Pass through | Data signal |
| 3 | Pass through | Data signal |
| 4 | Pass through | Electrical power supply (VCC) |
| 5 | Pass through | Electrical power supply (GND) |
| 6 | Pass through | Data signal |
| 7 | Presence request signal | General purpose signal |
| 8 | Presence detection signal | Presence signal |

The general purpose signal may be, for example, a detection signal, no signal, or another functional signal.

In the detection phase, the device presence detector 414 enables the pass through connection path to couple the hub user connector 208 to the second protocol handler 410 in the network hub 202 or to pass to the network hub 303 and 304 through the network hub 302.

The network system of the present invention does not provide the electrical power to the interface connector unless a desired device is connected. With this system, the same interface connector supports a plurality of network protocols, such as Ethernet 10Base-T, 100Base-TX, or Token Ring. The desired device may run these or another kind of networking protocols.

Through a combination of circuitry and wiring arrangement, the present invention provides a low cost system that allows a first device, connected to one end of the twisted-pair cable, to detect a desired device connected to the other end of twisted-pair cable, and provide electrical power to it. The desired device receives the electrical power from the twisted-pair cable without physically attaching to the main body of the system for electrical power supply. Without physical attachment, the present invention provides a mobile computing solution for PDA and portable computers.

What is claimed:

1. A method of providing electrical power to a device upon the detection of the presence of the device communicating with a network system comprising the steps of:

providing a presence request signal by sending a bipolar timing signal to the device providing a response signal from the device;

detecting the presence of a device on a communication line by receiving the response signal from the device;

determining the type of device present;

providing electrical power to the device over the communication line in response to the type of device and the detected presence; and stop providing the electrical power to the device when the presence of the device is no longer detected;

communicating with the device in a first protocol in response to detection of the presence of the device.

2. The method of claim 1 wherein:

the detected device indicates its continuous presence from the provided electrical power.

3. The method of claim 2 wherein the detected device includes an electrical power source and indicates its presence from the electrical power source.

4. The method of claim 1 wherein the presence request signal is a symmetric bipolar timing signal.

5. The method of claim 1 further comprising the steps of: wireless communicating with the detected device.

6. A method according to claim 1 wherein the step of determining the type of device present further comprises the steps of:

providing electrical power to the device and communicating with the device in a first protocol in response to a detected first type of device; and communicating with the device in a second protocol in response to a detected second type of device.

7. The method of claim 6 further comprising:

communicating data between another network hub and the device in response to a dedicated second type of device.

8. A network system comprising:

a plurality of user interface connectors each adapted for coupling to a remote device; and a network hub coupled to the plurality of user interface connectors for communicating data between remote terminals coupled thereto, for identifying the operational protocol of a coupled device that indicates the type of device and communicating with said coupled remote device in said identified operational protocol, and for identifying the presence of an adapter of a first type coupled to at least one of the plurality of user interface connectors and continuously providing electrical power to the adapter according to the type of device in response to the identified presence of said adapter and stop providing the electrical power to the adapter in response to no identified presence of the adapter.

9. The network system of claim 8 wherein the operational protocol may be an Ethernet protocol.

10. The network system of claim 8 wherein the operational protocol may be a Token Ring protocol.

11. The network system of claim 8 wherein the operational protocol may be a wireless LAN protocol.

12. A method of providing electrical power to a device upon the detection of the presence of the device communicating with a network system comprising the steps of:

applying a presence request signal on a communication line;

monitoring the communication line for a presence signal;

receiving a presence signal from the device;

providing a control signal on a communication line when the presence signal is a continuous presence signal;

providing the presence request signal on a communication line when the feedback signal is not a continuous presence signal; and providing electrical power to the device according to the type of device when the signal is a continuous presence signal.

13. A device according to claim 12 further comprising the step of receiving a device identifier that indicates the type of device.

14. A network system comprising:
 a plurality of user interface connectors each adapted for coupling to a remote device;
 a first network hub for communicating in a first operational protocol and for sending a bipolar timing signal to the remote device to receive a response signal from the device to indicate the presence of the adapter; and
 a second network hub coupled to the plurality of user interface connectors for communicating data between devices coupled thereto and coupled to the first network hub, for identifying the type of device and the operational protocol of a coupled device, when the identified operational protocol of the coupled device is a first operational protocol, and communicating with said coupled device in a second operational protocol when the identified operational protocol of the coupled device is a second operational protocol, and for identifying the presence of an adapter of a first type coupled to at least one of the plurality of user interface connectors and continuously providing electrical power to the adapter in response to the identified presence of said adapter, and for stopping the providing of electrical power to the adapter in response to no identified presence of the adapter.

15. A system for controlling the application of electrical power to a detected device, comprising:
 a signal generator having a first input for receiving a bipolar timing signal, having a second input for receiving a control signal, and having a third input for receiving a select signal, and having an output for providing a presence request signal in response to the select signal being in a first logic state and for providing the control signal in response to the select signal being in a second logic state; and
 a feedback analyzer having an input for coupling to a device and having an output for providing a presence signal in response to a presence signal detected from the coupled device the device being detected as a particular type of device, and being coupled to the output of the signal generator, for providing the select signal in a second logic state when such a device is detected and providing a select signal of a first logic state when such a device is not detected, and for controlling the application of electrical power to the coupled device according to the type of device in response to the presence signal.

16. A detection circuit configured to detect the presence of a remote device communicating with a computer network system comprising:
 a signal generator configured to generate a bipolar timing signal and to send the signal to a device communicating with the network system;
 a feedback analyzing circuit configured to receive a signal sent by the device in response to the bipolar timing signal sent by the signal generator to determine whether the device is present in the system;
 a detection circuit configured to determine the mode of operation under which the device operates.

17. A detection circuit according to claim 16 further comprising:
 a power generator configured to deliver power to the device according to the device's operational mode of operation.

18. A detection circuit according to claim 17, wherein the first mode of operation indicates that it is safe to send power to the device and wherein the second mode of operation indicates that it is not safe to send power to the device.

* * * * *